Figure 1:
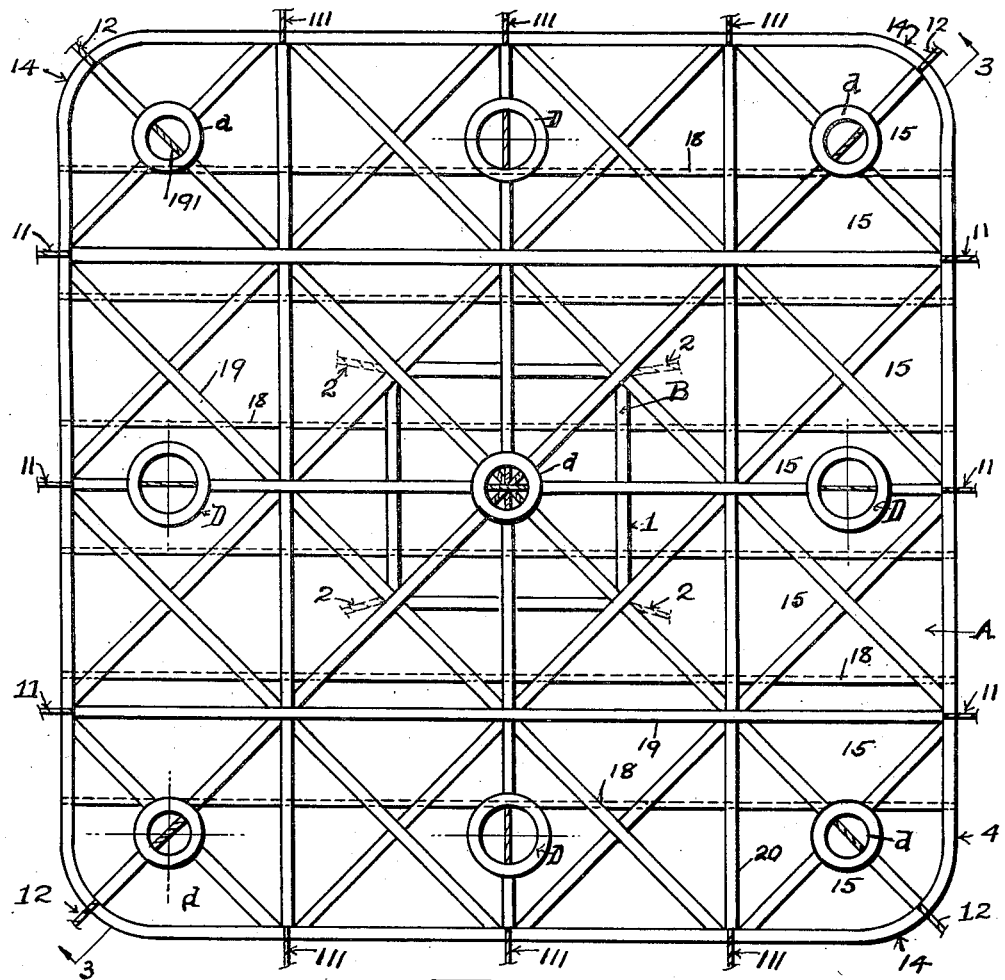

Oct. 19, 1937.  S. H. KNIGHT  2,096,520
PARACHUTE
Filed Sept. 18, 1933  4 Sheets-Sheet 1

Inventor
Samuel H. Knight
Mark W. Collet
his Attorney

Oct. 19, 1937.　　　　S. H. KNIGHT　　　　2,096,520
PARACHUTE
Filed Sept. 18, 1933　　　4 Sheets-Sheet 2
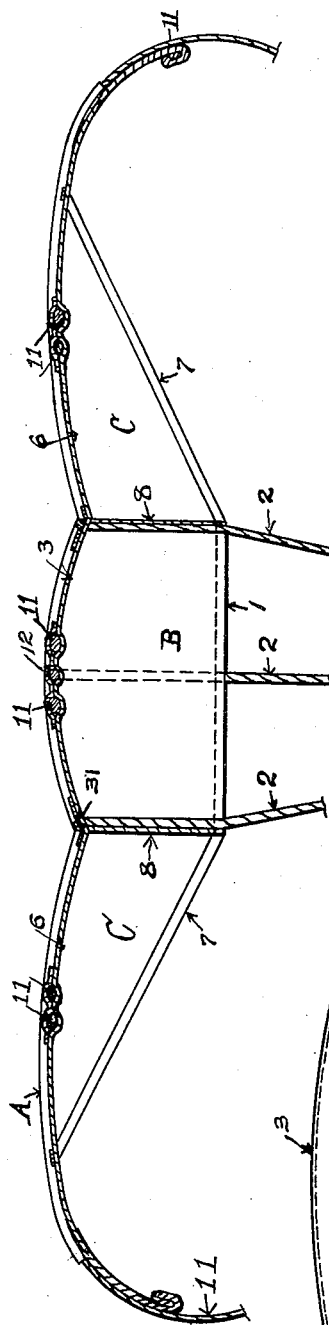
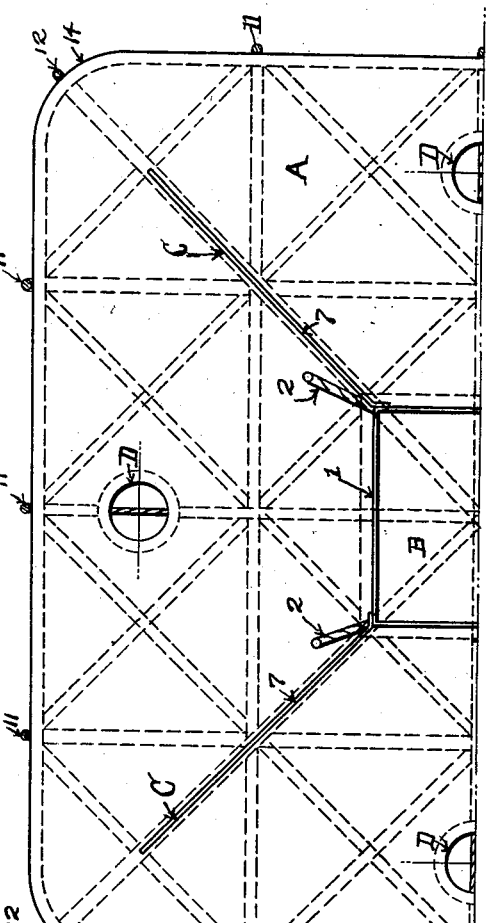
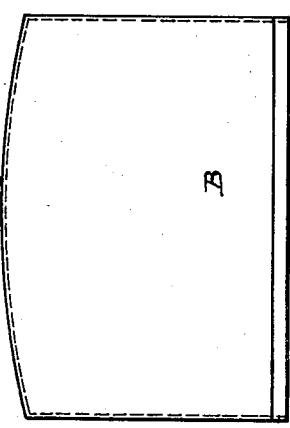
Inventor
Samuel H. Knight
By Mark Colbell
his Attorney

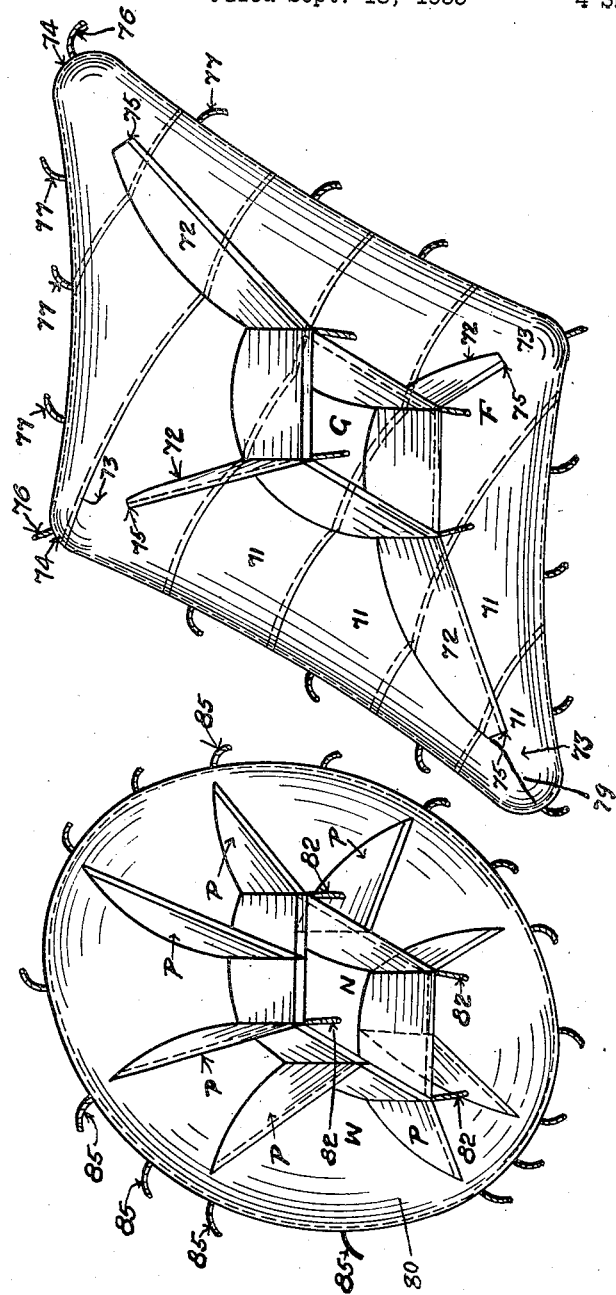

Oct. 19, 1937.  S. H. KNIGHT  2,096,520
PARACHUTE
Filed Sept. 18, 1933   4 Sheets-Sheet 4
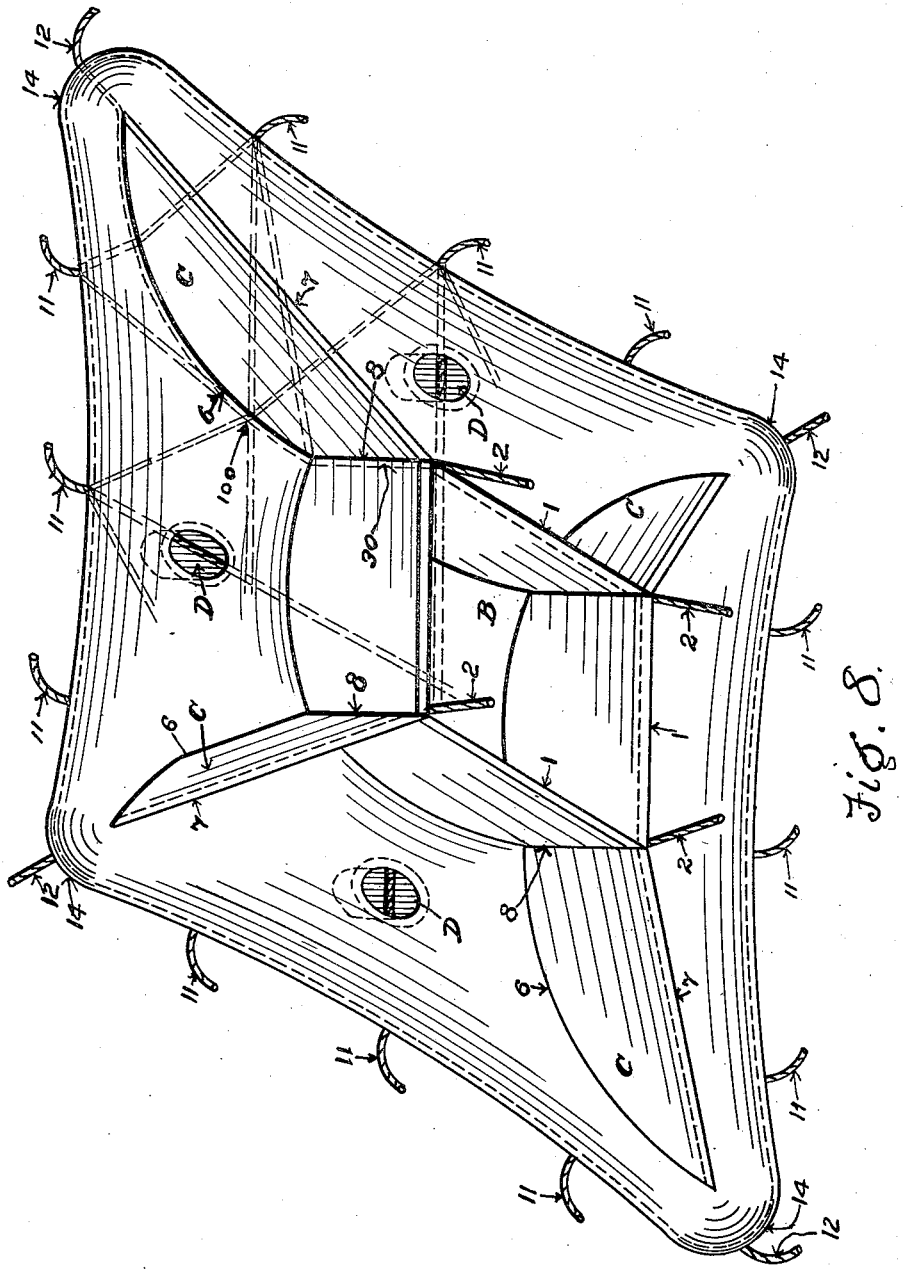
Inventor
Samuel H. Knight
By Mark W. Collet
His Attorney Patented Oct. 19, 1937

2,096,520

UNITED STATES PATENT OFFICE 2,096,520

PARACHUTE

Samuel H. Knight, Lancaster, Pa.

Application September 18, 1933, Serial No. 689,848

9 Claims. (Cl. 244—145)

The use of parachutes has been rendered dangerous by building them to make them ride on a column of air which they push downwards and which, unavoidably, they at intervals also slide sideways away from. This sliding on the column on which the parachute rides makes the line of descent uncertain, and the place where the landing will occur difficult to ascertain, or not ascertainable at all. The portions of the canopy adjacent to the periphery in the conventional parachute are drawn down by the pull on the load ropes into a curve that brings the parts nearest the periphery nearly perpendicular, tending to prevent sidewise slip, and were deemed needed for this purpose, but this diminished the portion of the area of the canopy that served to support the load. The flattening of the canopy when in flight was considered dangerous, because it increased the side slip. The material adjacent to the circumference of the canopy in the parachute of the conventional form did not support the weight of the load but added to the weight of the canopy. Apart from its action in preventing sideslipping, it was useless and added materially to the weight of the canopy.

I have devised a parachute where the area of the parachute is materially decreased, and where side-slipping is prevented almost entirely. For this purpose I have utilized amongst others, three principles. I suspend the load from points around the periphery and from points in the interior of the canopy. This arrangement of the load ropes flattened the canopy, permitting a decreased fabric area to have a supporting area that equals or exceeds the supporting area of a canopy of a parachute of a conventional form with a much larger fabric area of canopy.

I use means for preventing the sidewise slip of the parachute based on the combined utilization of two principles, one, the use of baffles so placed that the sidewise slip of the parachute is opposed by fins placed to baffle the sidewise motion of the canopy and second, the formation of openings, by means of widely distributed vents so that the canopy will have sufficient surface to give the supporting power but will allow the air to pass through it rather than flow along its under surface and over its edges. This results in requiring actually a lesser carrying surface in the canopy than is required when the canopy is of centralized ventage. Either of these means may be used to prevent side-slipping, may be utilized without the other, but the combining of both gives, I have found in constructions I have made up to this time, different and better results than the use of the one without the other.

I believe that my discovery that the friction of the air passing through sufficiently numerous vents in a sufficient proportion so that the canopy would not sideslip away from above the top of a column of air that was somewhat compressed, and away from below a partial vacuum above the descending canopy, into an air column free from this compression, furnished a better support for the load, and also enabled the parachute to descend in a direction easily calculable, instead of descending in uncertain and often distinctly zigzag directions is important. I aver I made this discovery before it was made by others. This result is obtained because of several actions of the air. Primarily, the passage of any cup shaped body through the air, if drawn with the open mouth forward is much less resistant if the cup shaped body is closed at the bottom than if the bottom has an opening through its bottom or in other parts through which the air may flow through the cup. This has often been determined by experiments in the Navy with towed sleeve formed targets. If these targets are open at their forward ends and closed at their rear end, the resistance is much less than if a passage of air through the sleeve were permitted, either by an opening in the rear of the sleeve or some other means employed to permit the exit of air at the rear portions of the sleeve. This action has been explained by the fact that an increased air friction is produced. Besides this advantage there is another, in that the wide distribution of air prevents the oscillations of the parachute, which oscillations reduce the extension horizontally of the supporting material and also spill the air.

By the employment of these means, I secure many advantages among which may be mentioned (1) I decrease in all cases the fabric area of the canopy and hence the cost and weight of the parachute. (2) I can eliminate almost completely sideslip either by causing the air to pass through the parachute canopy instead of along its under surface and around it or by means of the baffles above referred to or by the conjoint use of both. (3) I diminish the possibility of tearing the parachute. (4) Where the canopy is made of a porous material, its weight becomes less per square area than a thicker fabric, thus decreasing still further the weight carried by the wearer of the parachute. (5) The fins extending vertically from the lower side of the canopy for their entire width and joining the canopy at a sharp angle form much better baffles against sideslipping than the parts of the canopy of the conventional parachute that are connected to the supporting area of the canopy by a curved surface, which produces a stream line structure over which the air flows too freely, again economizing in fabric needful to produce the desired result, and consequently in the weight of the canopy. Other advantages will appear as the specification is read.

The structure which I consider the best form of my device has a central box or cup on its lower side, open at its bottom, and also a number of radially extending fins. The cup is open at the bottom to receive the air. The canopy may be made preferably square or approximately so, for instance, it may be square with rounded corners, as shown in Fig. 1. Or it may be circular as shown in Fig. 8, or may be of other shapes, as my invention may be embodied in quite varying forms of canopies. The canopy is flattened by the use of load cords that extend from points within the periphery or the circumference of the canopy in addition to those that extend from the circumference or periphery to the load. These inner and outer load cords are permanent in length and are permanently attached to their points of attachment to the canopy. Their points of attachment to the load or to the load carrying elements are also permanent and their arrangement is approximately symmetrical. Less costly materials may be substituted for the silk, when economy is essential, the heavier weight per square yard required for such a material, to give the same tensile strength as silk being overcome by the lesser number of square yards needed.

The radiating fins prevent, to a great extent, side slip. The central box open at the bottom co-acting with the other elements, causes a very rapid opening of the canopy, and many other results secured by my invention will appear below, as I describe the best forms of my invention of which I am now aware and which will follow here.

Figure 2:
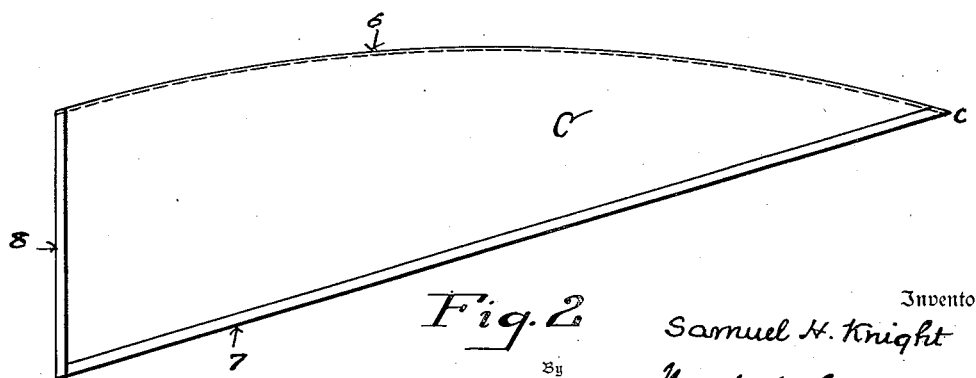

Fig. 1 is a plan of the canopy and its directly cooperating elements, viewed from above. Fig. 2 is an elevation of one of the radial fins. Fig. 3 is a section on line 3—3, of Fig. 1. Fig. 4 is a plan of one half of the canopy and some of its directly coacting elements, viewed from below. Fig. 5 is an elevation of one of the sides of the central box. Fig. 6 is a perspective view of the inflated canopy viewed from beneath showing the box, the radially running fins, and portions of the load ropes and other coacting elements, the canopy being formed by strips of material that extend diagonally across the canopy. Fig. 7 shows, in perspective, a circular canopy with the box and radial fins, and Fig. 8 is a perspective view of the under side of the inflated canopy.

The characteristic elements in this structure are the central box marked B in the forms illustrated in Figs. 1 to 5; G, that illustrated in Fig. 6 and N, that illustrated in Fig. 7, and the radiating fins C, 12, and P, in these respective figures, co-acting with the double series of substantially symmetrical load cords that flatten out the canopy while the other elements prevent oscillations and side slip, and are permanently attached to the load and the parachute canopy and are of constant length, and the vents disposed so as to cause the air to pass through the canopy instead of around the periphery of the canopy.

Describing now the forms shown in Figs. 1, 2, 3, 4 and 5. A square canopy A, which may have rounded corners 14 has the central box B formed of four sheets 1, which may be separate sheets attached at their edges to each other or be formed of a single piece of material folded or similarly formed, attached to the lower side of the canopy, at the upper edge of the sheets 1.

The fins C, C, extend radially outward. They may be vanishing fins, that is, fins that come to a point c, at or near their outer ends. These fins may also be secured at a side 8, which is nearer the apex to the box B at its corners; the upper side 6 of a fin, preferably, is sewed to the inside of the canopy, and should be curved so that it will follow the curve of the canopy when the parachute is in flight. When the construction is followed out completely a box B will be positioned on the inner side of the canopy and from the corners of this box B, are fins, C, C, C, C, extending radially towards the periphery of the canopy. When the canopy is rectangular these fins C, C, C, C, extend towards the corners of the canopy.

The load ropes in my preferred form of parachute have a very advantageous form. As a general scheme they are a series of symmetrically arranged cords in two series at different distances from the apex of the canopy. In this construction, one set of the load ropes that extend downward from the periphery runs across it diagonally. The other sets run across the canopy at right angles with each other and at an acute angle with the diagonally running peripheral load cords. In the particular form of device shown, where the canopy is substantially square, the diagonal ropes 12 make substantially an angle of 45° with the ropes 11, and ropes 111, which latter two cross at right angles with each other.

Preferably the interior load ropes 2, 2, extend from the corners of the box B, where the fins C, are fastened to the box. These ropes may be carried over the diagonally running load ropes 12, and may be suitably fastened to them. They are shown as enclosed in the seam joining the end of a fin to the box.

The two series of load ropes are permanently secured, at their lower ends, to the harness or other load carrying device, are secured or together, and are of a length relatively to each other that, when stretched taut and the canopy extended, the latter will be kept substantially flat. The harness and the lower portions of the load cords are not shown, as their particular construction other than the relative lengths of the load ropes is not a feature of my invention. The lengths of the cords should be regulated so that the inner load ropes exert a permanent and substantial pull on the portions of the canopy to which they are attached.

The canopy in this form of my invention is rectangular, with rounded corners. I prefer to construct it by joining side to side, strips of fabric that extend across the canopy. These strips are sewed together by lines of stitching 18, in practice. The canopy may have also reinforcement strips. In my preferred form, I make these reinforcing strips in four sets. The first two sets extending diagonally of the canopy, the reinforcing strips of the first set running at right angles to those of the second. The last two sets, extending from one side to the other of the canopy, and the strips of one set running at right angles to the strips of the other. I have found the greatest strength for a given weight was obtained when the sets 19 and 20 were at almost ½ of a right angle with each other. These reinforcing strips, or some of them may serve also as cover strips for the load cords. When the latter are extended across the canopy, in the form illustrated, the diagonal strips extending between the corners 14, 14, 14, 14, contain the portion of the cords 12 that pass over the canopy and the portions of the cords 11, 11, 11, and 111, 111, 111, 111, that pass over the canopy are covered by the strips 20, 20. A square of reinforcing strips 21, may be positioned around the central portion of the canopy.

The parachute may depend upon the fins C, to prevent side slipping, but I prefer to have it so that the air will pass sufficiently through it to prevent or at least greatly reduce the tendency of the flatter canopy to side slip. In practice, I provide multiple vents such as D, D, D, D, and $d, d, d, d, d, d$, so placed that the air pressed downward by the canopy may escape through the canopy body rather than around the periphery.

The friction of the air that passes through these vents will support the canopy more effectively than it would do flowing along the stream line under surface and out at the edges of a canopy of a conventional form. It may be noted that two series of holes, the larger marked D, and the lesser marked $d$, are shown. Either kind of holes may serve as vents or, as I prefer, both may be used. Where the material of the canopy is porous enough, the vents may be omitted and reliance placed on the escape of the air through the interstices of the fabric. The ratio of interstices to area of fabric, or of vents to area of fabric may be ascertained experimentally to determine the relation that will produce the optimum result. It may be stated generally thus, the porosity of the canopy whether produced by vents or through actual porosity of fabric should be sufficient to minimize the oscillations to a degree that they will not produce a side slip of the canopy, when the fins are not used, and sufficient, when fins are used, to prevent a side slip uncontrollable by the fins.

In the form of device illustrated in Fig. 6, the strips 71 out of which the canopy is constructed, run diagonally. The box G, and the fins 72, 72, 72, 72, are in general construction like the similar forms shown in Figs. 1 to 5, except that the fins are not of the type known as vanishing fins, but have an edge 75 and may be tautened by a cord 79, running from the lower edge of the fin to the corner of the canopy. The strips 71 may be sewed along their edges 73, to each other. It may have rounded corners 74, and the load ropes may run similarly to those in the form shown in Figs. 1 to 5 inclusive. The diagonal load ropes are marked 76.

The form of device shown in Fig. 7, shows a circular canopy 80, having a box N in the centre, from which extend the fins P, P, P, radially. These fins may number eight. In fact, that or a larger number of fins may be used in any form of my device. Load ropes 85, 85, 85, may extend from the periphery of the canopy to the load, and the interior load ropes 82, 82, may extend from a suitable place within the periphery to the load. In this form the size of the box and the size and number of the fins fit the device for use where the canopy fabric is porous but without vents of substantial size.

The nature of the invention set forth in the earlier portion of this specification is not to be taken as limited by the particular embodiments of it described in later portions of it. Many changes in embodiment may be made without departing from my invention, which is to be taken broadly, as defined by the claims that follow here.

I claim:—

1. A parachute that has the whole of its canopy substantially horizontal when in flight, and having instrumentalities for maintaining it against side slip, located wholly upon the inner side of the canopy and away from its periphery; said instrumentalities consisting of an open box structure enclosing the middle portion of the bottom of the canopy, and set at a distance from the periphery of the canopy, said box structure having its sides formed of textile material, extending downward from the bottom of the canopy, and sewed at their upper edges to the canopy, and substantially vertical fins also formed of textile material, and extending outwardly from the box structure toward the periphery of the canopy and downwardly from the bottom of the canopy, the upper edges of said fins being sewed to the bottom of the canopy; said parachute being provided also with load cords each of fixed length, said cords extending from different points on the canopy and being attached thereto at varying distance from its middle point to the load; load cords attached to the canopy at such points as are nearer its middle, being sufficiently shorter than those attached to the canopy at greater distance from the middle of the canopy, to maintain the substantial flatness of the canopy; the canopy being provided also with continuously open apertures disposed at various points thereof, of sufficient combined area to permit a larger proportion of the air supporting said canopy to pass directly upward therethrough, whereby the flow of air toward and over the edges of the periphery of the canopy is largely diminished.

2. A square parachute that has its entire canopy substantially horizontal when in flight and having instrumentalities for maintaining it against side slip, positioned on the lower side of said canopy and away from the periphery of the canopy; said instrumentalities consisting of an open bottom box structure of textile material, extending downward from the lower side of the canopy, and enclosing the middle portion of the lower side of the canopy and set at a distance from the periphery of said canopy, and having the sides of said box structure parallel with the edges of the periphery of the canopy opposite them, and sewed at their upper edges to the inner side of the canopy and also fins of textile material, extending downward from the canopy and outward, from the corners of the box structure, toward the periphery of the canopy, the upper edges of said fins being sewed to the bottom of said canopy; said parachute being provided also with load cords extending between the load and points on the lower side of said canopy at varying distances from the middle of said canopy, each of said cords being of a fixed and permanent length, and the cords that are attached to the canopy nearer its middle point, being shorter than those attached to the canopy at points more distant from the middle of the canopy, said canopy being provided also with continuously open apertures sufficiently extensive in joint area to permit a large proportion of the air supporting said canopy to pass directly upward through these apertures in the canopy whereby the flow of air toward and over the peripheral edges of the canopy is diminished largely.

3. A parachute that has the whole of its canopy substantially horizontal when in flight and having instrumentalities for maintaining it against side slipping wholly located on the inner side of the canopy and away from the edge of the canopy, said instrumentalities consisting of an open bottom box structure, extending downward from the canopy, and enclosing the middle portion of the lower side of the canopy, and set at a distance from its periphery and having its sides formed of textile material, and extending vertically downward from the canopy and sewed at their upper edges thereto, and also fins of a textile material extending from the box shaped structure toward the edges of the said canopy and sewed at their upper edges to the inside of said canopy, said parachute being provided also with load cords extending from the canopy to the load between different points at varying distances from the middle of said canopy, the length of each load cord being fixed, but the length of the load cords extending between the load and the portions of the canopy nearer its middle part being sufficiently less than the length of the cords between the load and the portions of the canopy further away from the middle of the canopy to maintain the canopy substantially horizontal, and said parachute also being provided with holes through the canopy, sufficiently numerous to distribute the points of air passage therethrough over the canopy evenly, and of a total area allowing a large portion of the air, on which the parachute is carried, to pass directly upward through them, thereby diminishing substantially the flow of air along the lower side of the canopy toward and over the edges of the periphery of the canopy.

4. The device defined in claim 1 wherein the fins therein mentioned diminish in height uniformly toward the periphery of the canopy and end entirely before extending to the periphery of the canopy.

5. A parachute having a substantially flat canopy and comprising instrumentalities for maintaining the substantial flatness of the canopy and means for preventing side slip and irregular descent, comprising widely distributed apertures in the canopy, the sum of the areas of which apertures is sufficient to permit the larger portion of the displaced air to pass directly upward through the canopy, combined with fins of textile material secured to the lower side of said canopy, and lying away from its periphery, and projecting substantially vertically downward, and positioned to oppose the flow of air relatively to said canopy along the lower side of the canopy circularly and toward the periphery of the canopy.

6. A parachute having a substantially flat canopy, comprising instrumentalities for maintaining the substantial flatness of the canopy, consisting of load cords extending between the load and portions of the canopy at different distances from its middle, the cords extending between the load and the portions of the canopy nearer its middle portion being shorter than those extending from the load to portions of the canopy nearer its periphery, and means for preventing side slip and irregular descent, consisting of widely distributed apertures in the canopy, the sum of the areas of which apertures is sufficient to permit a large part of the air to pass directly through the canopy, in combination with fins of textile material secured to the lower side of the canopy and lying away from its periphery, and extending substantially downward from said lower side, and positioned to oppose the flow of air relatively to said canopy, both circularly and toward the periphery of said canopy.

7. A parachute that has its canopy substantially horizontal when in flight, and having instrumentalities for maintaining it against side slip located wholly upon the inner side of the canopy and away from its periphery; said instrumentalities comprising a series of downwardly extending fins of a textile material surrounding the middle portion of the bottom of the canopy and set at a distance from the periphery of the canopy, sewed to their upper edges to the canopy, and substantially vertical fins also formed of textile material, and extending outwardly toward the periphery of the canopy and downwardly from the bottom of the canopy, the upper edges of said fins being sewed to the bottom of the canopy, said parachute being provided also with canopy flattening devices comprising load cords, each of fixed length, said cords extending from the load to the canopy and secured thereto at points of varying distance from its middle point, the load cords attached to the canopy at points nearer its middle being sufficiently shorter than those attached to the canopy at greater distance from its middle, to maintain the substantial flatness of the canopy, the canopy being provided also with apertures disposed at various points thereof, of sufficient combined area to permit a larger proportion of the air supporting said canopy to pass directly upwards therethrough, whereby the flow of air toward and over the edges of the periphery is largely diminished.

8. A parachute having a square flattened canopy, having apertures for allowing the greater portion of the air to pass directly through said canopy, means for preventing side slip and irregular descent, comprising vertical fins downwardly projecting of textile material surrounding the middle portion of the canopy, and sewed at one edge to the bottom of the canopy, and cooperating vertical fins of textile material extending outward and toward the periphery of the canopy, and means for flattening the canopy, comprising load cords attached to the canopy at points at various distances from the middle of the canopy, the cords nearer the middle point being shorter than those farther from it.

9. A parachute having a flattened canopy that has apertures therethrough distributed sufficiently widely and of an aggregate capacity sufficient to cause more air to pass through such apertures than will flow over the peripheral edges of the canopy, in combination with means for maintaining the canopy substantially flat, comprising load cords extending from the load to points on the canopy at various distances from its middle, said cords varying in length as these points of attachment to the canopy are more or less distant from its middle, and with means for preventing side slipping, consisting of fins of textile material extending vertically downward from the under side of said canopy.

SAMUEL H. KNIGHT.